United States Patent [19]

Forrest

[11] 4,204,795
[45] May 27, 1980

[54] WIND COLLECTING METHOD AND APPARATUS

[76] Inventor: William J. Forrest, 2808 NW. 56th, Oklahoma City, Okla. 73112

[21] Appl. No.: 835,184

[22] Filed: Sep. 21, 1977

[51] Int. Cl.² .............................................. F03D 3/06
[52] U.S. Cl. ..................................... 415/2; 416/230; 416/240
[58] Field of Search ....................................... 415/2–4; 290/44.55; 416/197 A, 132 B, 230 R, 240 A, 196 A, 229 R

[56] References Cited

U.S. PATENT DOCUMENTS

| | | | |
|---|---|---|---|
| 658,129 | 9/1900 | Steude | 415/2 |
| 705,922 | 7/1902 | Gran | 415/2 |
| 1,342,318 | 6/1920 | Yanacopoulos | 416/197 A X |
| 1,578,835 | 3/1926 | Kothe | 416/197 A X |
| 2,202,013 | 5/1940 | Lougheed | 416/230 X |
| 3,633,850 | 1/1972 | Feldman | 416/240 A X |
| 3,995,170 | 11/1976 | Graybill | 416/132 B X |
| 4,047,833 | 9/1977 | Decker | 416/197 A X |
| 4,083,652 | 4/1978 | Isaacson | 416/240 A X |
| 4,086,023 | 4/1978 | Morgan | 416/132 B |

FOREIGN PATENT DOCUMENTS

| | | | |
|---|---|---|---|
| 365045 | 6/1906 | France | 415/2 |
| 606622 | 6/1926 | France | 415/2 |
| 997942 | 1/1952 | France | 415/3 |
| 1011132 | 6/1952 | France | 415/2 |
| 1021619 | 2/1953 | France | 416/197 A |
| 1041534 | 10/1953 | France | 415/2 |
| 2289767 | 5/1976 | France | 416/240 A |
| 445080 | 1/1949 | Italy | 416/197 A |

*Primary Examiner*—Everette A. Powell, Jr.
*Attorney, Agent, or Firm*—Dunlap, Codding & McCarthy

[57] ABSTRACT

An improved wind collecting apparatus utilized for transforming wind energy to rotary motion. The rotary motion is then used to drive an electric generator or the like. The apparatus generally comprises four semi-cylindrically shaped wind collecting blades connected to a shaft which is mounted for rotation about an axis of rotation and wind deflectors are positioned near the blades for directing portions of the wind. In one embodiment, the shaft is disposed in a plane substantially parallel with the earth's surface and, in one other aspect, the blades are mounted for rotation generally above a cavity formed in the earth's surface. The present invention also contemplates an improved blade structure.

12 Claims, 3 Drawing Figures

WIND COLLECTING METHOD AND APPARATUS

BACKGROUND OF THE INVENTION

1. Field of the Invention

The present invention relates generally to the field of transforming energy to rotary motion, and, more particularly, but not by way of limitation, to the field of wind collecting apparatus for transforming wind energy to rotary motion provided at an output shaft.

2. Description of the Prior Art

In recent years it has become apparent that passive energy sources such as the wind may someday have to replace the energy now being supplied by the fossil fuels. Thus, it is desirable to have wind harnessing apparatus which can be linked together in a relatively large power grid. Such power grids utilizing wind-produced energy could concievably service a large portion of the population, replacing the ever-diminishing supply of fossil fuels.

There have been many attempts in the past to construct apparatus which can harness the potential energy contained in surface winds. These apparatus have been utilized for such purposes as pumping water and generating electricity. However, their use has generally been limited to localized areas such as farms or the like because of insufficient size, and inefficient utilization of the wind.

For example, U.S. Pat. No. 43,049, issued to A. Trim, disclosed a wind wheel having three semi-circularly shaped blades mounted for rotation on a vertical axis. Another example was shown in the U.S. Pat. No. 259,563, issued to L.D. Lowther. The Lowther patent disclosed a windmill having a plurality of bucket-like blades mounted for rotation about a vertical axis, similar to the apparatus disclosed in the Trim patent.

Several other apparatus utilized to harness the power of the wind were disclosed in the following U.S. Pat. Nos.: 1,361,696, issued to D. Domenico; 1,646,673, issued to M. E. Wilson; 1,808,874, issued to E. F. Wilson; and 2,240,290, issued to S. R. DuBrie.

U.S. Pat. No. 1,200,308, issued to J. C. Bunnel, disclosed a water motor utilized to harness the energy contained in flowing water.

In order to substantially increase the output of such apparatus, the area of the blades must be increased a considerable amount. It may also be necessary to position such an apparatus relatively high above the earth's surface to make optimum use of the velocity of the wind. Obviously, via increasing the size of the blades or by positioning the blades at a high elevation, the apparatus becomes more and more susceptible to being damaged or destroyed by high gusts of wind. Extensive bracing and structural support could conceivably be utilized to firmly anchor such a relatively large apparatus. However, the benefits achieved by doing so would all but be cancelled by the costs of material and construction.

Therefore, it would seem that wind harnessing apparatus having blades mounted in such a manner are undesirable and impractical for large scale production of electricity via the wind.

SUMMARY OF THE INVENTION

An object of the present invention is to provide an improved wind collecting apparatus which optimally utilizes the energy contained in surface winds to provide rotary motion for driving an electric generator or the like.

Another object of the present invention is to provide an improved wind collecting apparatus which can be formed and constructed via using relatively inexpensive and readily available materials.

One other object of the present invention is to provide a passive energy source which is substantially pollution-free.

Yet another object of the present invention is to provide improved wind collecting apparatus which can be constructed on a relatively large scale in open areas of land to optimally make use of local prevailing winds. The apparatus could, thus, be incorporated into an extensive power network to supply the energy needs of large portions of the population.

Still another object of the present invention is to provide a wind collecting apparatus that, when stationarily positioned in relation to the direction of local prevailing winds, will still provide adequate power output even if the direction of the wind changes substantially in relation to the direction of the local prevailing winds. Another object of the invention is to provide a wind collecting apparatus which is economical in construction and operation.

Other objects, advantages and features of the present invention will become apparent from the following description when read in conjunction with the drawings and the appended claims.

DESCRIPTION OF THE PREFERRED EMBODIMENT

Figure 1:
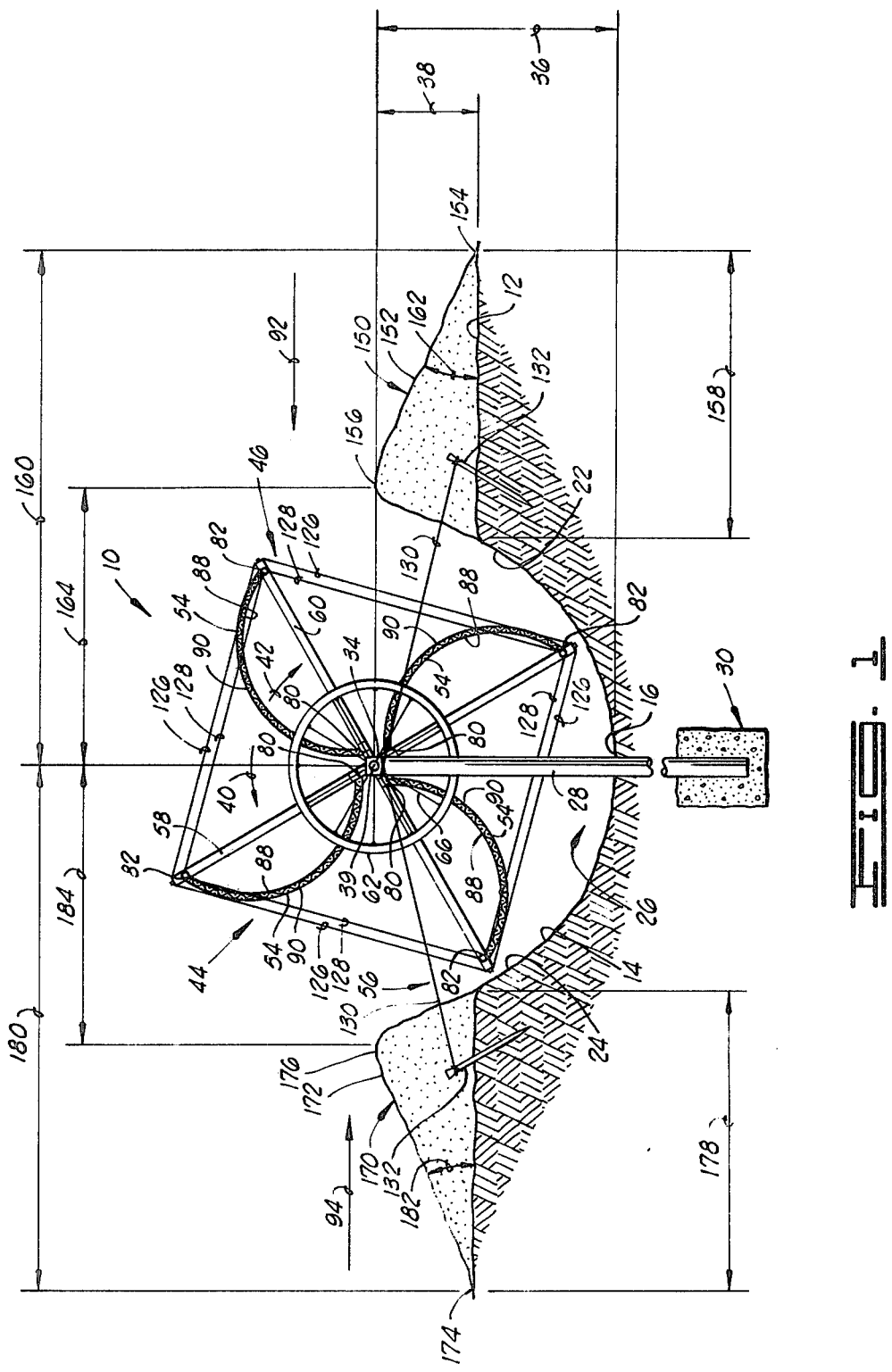
FIG. 1 is a partial cross-sectional, end elevational view of a wind collecting apparatus constructed in accordance with the present invention.
Figure 2:
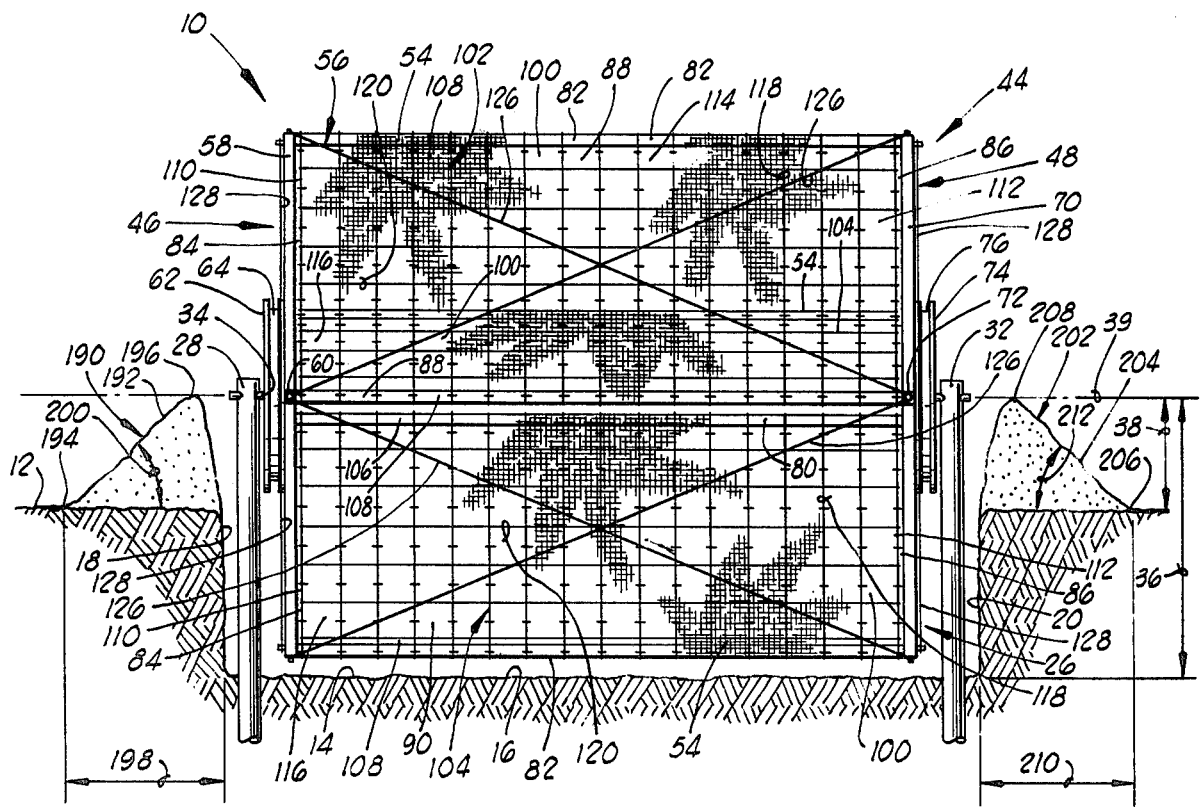
FIG. 2 is a partial cross-sectional, front elevational view of the wind collecting apparatus shown in FIG. 1.

Referring to the drawing in general, and to FIGS. 1 and 2 in particular, shown therein and designated via the general reference numeral 10 is an improved wind collecting apparatus constructed in accordance with the present invention. The apparatus 10 is generally utilized to transform energy contained in wind to rotational motion, and thus the apparatus 10 is sometimes referred to herein as "wind energy transformation apparatus". This rotational motion so produced can then be coupled to an apparatus such as an electric generator (not shown) to produce electrical energy, for example. It should be noted that it is contemplated within the scope of the present invention that the wind collecting apparatus 10 could be constructed in a greatly enlarged and more sophisticated form and be incorporated into an extensive power network.

In one embodiment, the wind collecting apparatus 10 is supported on the earth's surface 12 and, in this embodiment, a cavity 14 is formed in the earth's surface 12 extending a distance in the earth's surface 12 terminating with a lowermost cavity surface 16. The cavity 14 intersects the earth's surface 12 and has opposite first and second ends 18 and 20, respectively, a first side 22 and a second side 24. The cavity 14 forms cavity walls in the earth and provides a space 26 of lower pressure relative to the pressure of the wind generally at the earth's surface 12, in a manner and for reasons which will be made more apparent below.

It should be noted that, in one embodiment, the wind collecting apparatus 10 is supported on a retainer (other than the earth's surface 12) with an upper surface and a cavity is formed in the upper surface of the retainer. The cavity in the retainer and the upper surface of the retainer are utilized in conjunction with the present invention in a manner and for reasons exactly like that described herein with respect to the earth's surface 12 and the cavity 14 and thus the retainer is not specifically shown in the drawings.

A first support post 28 is positioned within a medial portion of the cavity 14, near the first end 18 of the cavity 14. One end of the first support post 28 is inserted a distance into the earth and, in this position, the first support post 28 is securely anchored in the earth via a concrete anchor 30. The first support post 28 extends a distance in a generally vertical direction to a position generally above the earth's surface 12.

A second support post 32 is positioned within a medial portion of the cavity 14, near the second end 20 of the cavity 14. One end of the second support post 32 is inserted a distance into the earth and, in this position, the second support post 32 is securely anchored in the earth via a concrete anchor (not shown) similar to the concrete anchor 30 described before. The second support post 32 extends a distance in a generally vertical direction to a position generally above the earth's surface 12, and the second support post 32 is spaced a distance from the first support post 28.

A shaft 34 is disposed between the first and second support posts 28 and 32. The shaft 34 extends generally between the first and the second ends 18 and 20 of the parallel with respect to the earth's surface 12. The shaft 34 is a distance 36 from the lowermost cavity surface 16 and the shaft 34 is a distance 38 from the earth's surface 12. One end of the shaft 34 is journally connected to the first support post 28 and the opposite end of the shaft 34 is journally connected to the second support post 32. Thus, the first and the second support posts 28 and 30 cooperate to support the shaft 34 for rotation about an axis of rotation 39 (shown in FIG. 2) generally defined via a centerline axially extending through the shaft 34, the shaft 34 being supported for rotation in a first direction of rotation 40 and in a second direction of rotation 42. In one embodiment of the invention, the shaft 34 extends in a direction generally transverse with respect to the direction of the prevailing winds at the wind collecting apparatus 10, for reasons to be made more apparent.

The wind collecting apparatus 10 also includes a rotating assembly 44 which is journally supported via the first and second support posts 28 and 32 and the shaft 34 for rotation about the axis of rotation 39 in the first direction of rotation 40 and the second direction of rotation 42. The rotating assembly 44 generally includes: a first blade support assembly 46, a second blade support assembly 48, a plurality of inner support members 50 (shown in FIG. 3), a plurality of outer support members 52 (shown in FIG. 3), a plurality of blades 54, and a bracing assembly 56. The inner and outer support members 50 and 52 each extend between and are connected to the first and second blade support assemblies 46 and 48, with the blades 54 being supported on the inner and outer support members 50 and 52. The portions of the bracing assembly 56 are utilized to enhance the structural integrity of the rotating assembly 44.

Referring more particularly to FIG. 1, the first blade support assembly 46 generally comprises a first bar 58, a second bar 60, and a first wheel 62. In an assembled position of the bars 58 and 60, the medial portions of the bars 58 and 60 are connected with the first bar 58 extending generally perpendicularly with respect to the second bar 60. The shaft 34 extends through the connected medial portions of the bars 58 and 60 such that the bars 58 and 60 each extend radially from the shaft 34, the bars 58 and 60 being connected to the shaft 34 generally at the connected medial portions of the bars 58 and 60. The bars 58 and 60 are positioned generally near the end of the shaft 34 supported via the first support post 28.

In a preferred embodiment, the bars 58 and 60 are constructed of a rigid material, such as square cross sectional aluminum tubing, for example. Since such a material is relatively thick in cross-section, notches (not shown) may be formed at the medial portions of the bars 58 and 60, and the bars 58 and 60 then can be interlocked when connected via such notches. This interlocking of the bars 58 and 60 further enhances the structural integrity of the first blade support assembly 46.

The first wheel 62 is connected to corresponding medial portions of the first and second bars 58 and 60 and is in axial alignment with the axis of rotation 39. More particularly, in an assembled position of the first blade support assembly 46 and the shaft 34, the first wheel 62 is disposed between the first support post 28 and the first and second bars 58 and 60 (as shown in FIG. 2), the first wheel 62 being secured to the shaft 34 in this position.

A groove 64 is formed in the outer peripheral surface of the first wheel 62, the groove 64 extending circumferentially about the first wheel 62. The first wheel 62 also includes a plurality of spokes 66 and a central hub (not shown). Portions of the first wheel 62 generally near the outer peripheral surface are connected to adjacent portions of the bars 58 and 60, and the spokes 66 are connected between the outer peripheral surface and the hub (not shown).

The first wheel 62 cooperates to enhance the structural integrity of the first blade support assembly 46, and also provides means for coupling the rotary power output of the wind collecting apparatus 10 to an electric generator or some other device for utilizing the rotary power output provided via the rotational movement of the shaft 34.

The second blade support assembly 48 is constructed similar to the first blade support assembly 46. The second blade support assembly 48 is generally supported on the shaft 34, generally near the second support post 32, as shown more clearly in FIG. 2. More particularly, the second blade support assembly 48 generally comprises a first bar 70 and a second bar 72, constructed similar to the first and second bars 58 and 60 of the first blade support assembly 46, and a second wheel 74 which is constructed similar to the first wheel 62, as shown in FIG. 2.

The bars 70 and 72 are connected at their medial portions in a manner similar to that described before with respect to the bars 58 and 60. In an assembled position of the bars 70 and 72, the bars 70 and 72 are positioned on the shaft 34, generally near the second support post 32, and in this position, the bars 70 and 72 are secured to the shaft 34.

The second wheel 74 is constructed similar to the first wheel 62 and has a groove 76 formed in the outer peripheral surface thereof and extending circumferentially about the second wheel 74. The second wheel 74 also includes a central hub (not shown) and a plurality of spokes (not shown). The second wheel 74 is connected to portions of the bars 70 and 72 and to the shaft 34 in a manner similar to that described before with respect to the first wheel 62 and the bars 58 and 60. In an assembled position of the second blade support assembly 48 on the shaft 34, the second wheel 74 is disposed generally between the bars 70 and 72 and the second support post 32, as shown in FIG. 2.

In an assembled position of the first and second blade support assemblies 46 and 48 and the shaft 34, the bars 58 and 70 and the bars 60 and 72, respectively, are radially aligned about the axis of rotation 39 in a parallel, spaced-apart relationship. The first and second blade support assemblies 46 and 48 are generally maintained in this spaced-apart relationship via the inner and outer support members 50 and 52.

Figure 3:
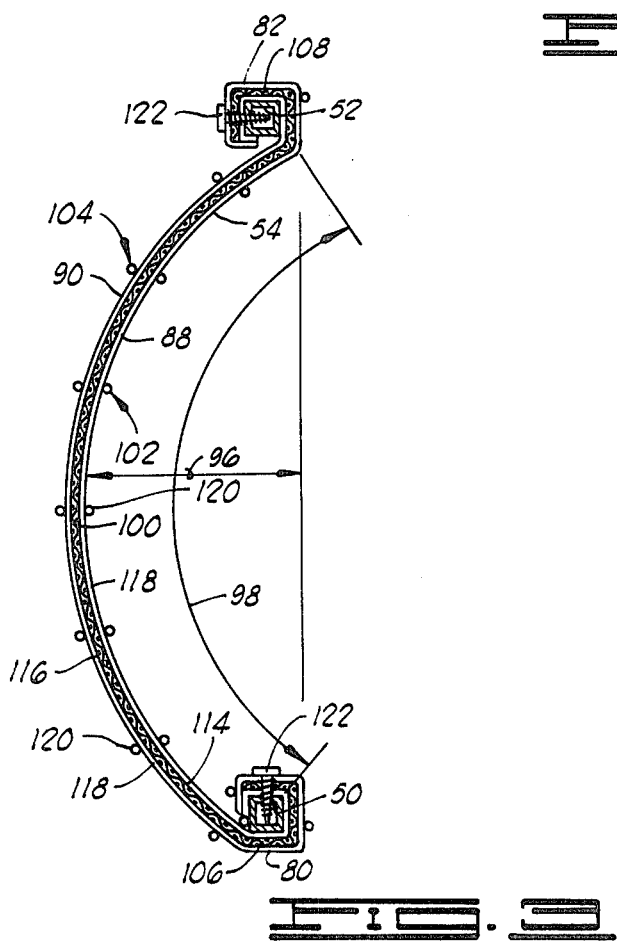
FIG. 3 is a partial cross-sectional view of one typical blade utilized in the wind collecting apparatus of FIG. 1.

In one embodiment, as shown in FIGS. 1, 2 and 3, four (4) of the inner support members 50, and four (4) of the outer support members 52 are utilized in the construction of the wind collecting apparatus 10, since there are four (4) blades 54 in this embodiment (the inner and the outer support members 50 and 52 being designated only in FIG. 3). There is one inner support member 50 and one outer support member 52 associated with each of the blades 54. The inner and the outer support members 50 and 52 cooperate to connect the blades 54 to the first and the second blade support assemblies 46 and 48, each blade 54 being connected to the shaft 34 via the inner and the outer support members 50 and 52 and the cooperating connections with the first and the second blade support assemblies 46 and 48.

Referring to FIG. 3, the inner and outer support members 50 and 52 are shown constructed of a rigid material, such as square cross sectional aluminum tubing, for example. It has also been found suitable to construct the inner and outer support members 50 and 52 from a material, such as steel cable, for example, which has been put under tension in an assembled position of the wind collecting apparatus 10. Even though material such as square cross sectional aluminum tubing or the like is suitable in the construction of relatively small wind collecting apparatus 10, a material such as steel cable under tension or the like is preferred in relatively large embodiments of the present invention.

In one preferred embodiment, four (4) of the blades 54 are utilized. It has been determined via experimentation that optimum rotation of the rotating assembly 44 will result when four (4) of the blades 54 are positioned and constructed in a manner to be described in greater detail below.

Each of the blades 54 is constructed in a similar manner and thus only one typical blade 54 is shown in detail in FIG. 3. Each blade 54 has a first end 80, a second end 82, a first side 84, a second side 86, a first surface 88 extending generally between the first and the second ends 80 and 82 and generally between the first and the second sides 84 and 86, and a second surface 90 extending generally between the first and the second ends 80 and 82 and generally between the first and the second sides 84 and 86. The first end 80 of each blade 54 is connected to the shaft 34 via portions of the first and the second blade support assemblies 46 and 48 and via portions of the inner and the outer support members 50 and 52, and each blade 54 extends a distance generally radially from the shaft 34, each blade 54 extending a distance axially along the length of the shaft 34 generally between the opposite ends of the shaft 34.

The first and the second surfaces 88 and 90 of each blade 54 each extend a distance radially from the shaft 34 and a distance axially along the length of the shaft 34, generally between the opposite ends of the shaft 34. The blades 54 are oriented on the shaft 34 such that wind moving generally in one direction (represented via the general directional arrow in FIG. 1 and designated therein via the reference numeral 92) impacts against the first surface 88 tending to move the blades 54 in one general direction for causing the shaft 34 to be rotated in the first direction of rotation 40. Further, wind moving generally in an opposite direction (represented via the general directional arrow in FIG. 1 and designated therein via the reference numeral 94) impacts against second surface 90 of the blades 54 tending to move the blades 54 in an opposite direction for causing the shaft 34 to be rotated in the second direction of rotation 42.

Each blade 54 is formed on a radius generally between the first and the second ends 80 and 82, the first end 80 of each blade 54 being connected to the shaft 34 and each blade 54 extending on a generally curvilinear path a distance generally radially from the shaft 34 terminating with the second end 82. In one preferred embodiment, as shown in FIG. 3, each blade 54 is constructed such that the first end 80 is disposed in a plane extending generally from the shaft 34 and the second end 82 is disposed in a plane substantially coplanar with respect to the planar disposition of the first end 80.

As shown more clearly in FIG. 1, the blades 54 are oriented about the shaft 34 such that each blade 54 extends in one direction generally radially from the shaft 34 and one other blade 54 extends a distance from the shaft 34 in a radial direction, generally opposite with respect to one of the other blades 54. The first and the second ends 80 and 82 of each blade 54 are disposed in a plane extending a distance generally from the shaft 34 substantially coplanar with respect to the planar disposition of one of the other blades 54.

It has been determined via experimentation that desirable results are achieved when the straight-line distance 96 (shown in FIG. 3), or the depths of each of the blades 54 is about one-third ($\frac{1}{3}$) the curved distance 98 between the first and the second ends 80 and 82.

More particularly and referring to FIG. 3, each blade 54 comprises a base 100, a first mesh screen 102 and a second mesh screen 104.

The base 100 has a first end 106 which cooperates to form the first end 80 of the blade 54, a second end 108 which cooperates to form the second end 82 of the blade 54, a first side 110 which cooperates to form the first side 84 of the blade 54, a second side 112 which cooperates to form the second side 86 of the blade 54, a first surface 114 which cooperates to form the first surface 88 of the blade 54, and a second surface 116 which cooperates to form the second surface 90 of the blade 54. The first surface 114 extends generally between the first and the second ends 106 and 108 and generally between the first and the second sides 110 and 112. The second surface 116 extends generally between the first and the second ends 106 and 108 and generally between the first and the second sides 110 and 112.

The first mesh screen 102 is disposed on the first surface 114 of the base 100 and the first mesh screen 102 extends over a substantial portion of the first surface 114 of the base 100. The second mesh screen 104 is constructed similar to the first mesh screen 102 and is disposed on the second surface 116 of the base 100, the second mesh screen 104 extending over a substantial portion of the second surface 116. The first and the second mesh screens 102 and 104 each comprise a plurality of spaced apart wires 118 (only one of the wires 118 being designated in the drawings via a reference numeral for clarity) extending in one direction generally between the first and the second sides 110 and 112 of the base 100 and a plurality of wires 120 (only one of the wires 120 being designated in the drawings via a reference numeral for clarity) extending in a transverse direction generally between the first and the second ends of the base 100. The wires 118 are connected to adjacent portions of the wires 120 to form a meshlike screen.

In one embodiment, the first and second mesh screens 102 and 104 can each be constructed of material generally referred to as "fence wire" having rectangular spaces of approximately three by four inches (3"×4") square, wire mesh screens of this type sometimes being referred to as "hog wire". In one preferred embodiment, the wires 118 and 120 are plastic coated.

In an assembled position of the blades 54 and the rotating assembly 44, the portions of the first mesh screen 102, the second mesh screen 104 and the base 100, generally near the first side 84 of each blade 54 are connected to one of the outer support members 52, and the portions of the first and the second mesh screens 102 and 104 and the base 100, generally near the second side 86 of each blade 54 are connected to one of the inner support members 50. As can be seen more clearly in FIG. 3, portions of the first and the second mesh screens 102 and 104 and the base 100, generally near the first and second sides 84 and 86 of the blades 54 are wrapped or formed around corresponding inner and outer support members 50 and 52. The blades 54 are connected to the inner and outer support members 50 and 52 via conventional fasteners such as sheet metal screws 122 (shown in FIG. 3), for example.

The first and second mesh screens 102 and 104 cooperate to enhance the structural integrity of the blades 54. Since the material forming the base 100 is non-permeable to air, any wind blowing into or impacting against the first surface 88 of one of the blades 54 will result in a force applied against the non-permeable material forming the base 100 and cause rotation of the rotating assembly 44 in the first direction of rotation 40. In a similar manner, any wind blowing or impacting against the second surface 90 will result in a force applied against the non-permeable material forming the base 100 and cause the rotation of the rotating assembly 44 in the second direction of rotation 42. When the rotating assembly 44 is rotating in the first or the second directions of rotation 40 and 42 caused via wind blowing against the blades 54, the rotating assembly 44 substantially encompasses or sweeps a generally cylindrically shaped space of rotation. The cavity 14 substantially defines a lower portion of this space of rotation.

The particular construction of the blades 54 consisting of the first and the second mesh screens 102 and 104 and the base 100 has been found particularly desirable in the wind collecting apparatus 10. The first and the second mesh screens 102 and 104 provide augmenting structural strength to the blades 54 and, with the particular grid construction of the mesh screens 102 and 104, the mesh screens 102 and 104 would continue to function to provide such augmenting structural strength even if one portion of the wire elements was broken or otherwise destroyed during the operation of the wind collecting apparatus 10. In contrast, if the mesh screens 102 and 104 were constructed of a solid sheet, then a tear, crack or break in one portion of such a solid sheet construction might expand to an extent which would render the blade 54 inoperable. In addition, the double layer of wire grid provided via the first and second mesh screens 102 and 104 cooperates to protect the base 100 from tearing when the wind direction is reversed and cooperates to further enhance the structural integrity of the blades 54.

The bracing assembly 56 generally comprises: a plurality of diagonal brace lines 126, a plurality of end brace lines 128, and a plurality of ground brace lines 130. The diagonal brace lines 126 are connected diagonally between end portions of the bars 58, 60, 70 and 72 via fasteners such as sheetmetal screws, for example.

The end brace lines 128 are also connected to end portions of the bars 58, 60, 70 and 72 but in a different manner than that of the diagonal brace lines 126. In one embodiment, four (4) of the end brace lines 128 are positioned in the space formed between the first blade support assembly 46 and the first support post 28; and four (4) end brace lines 128 are positioned in the space formed between the second blade support assembly 48 and the second support post 32. The end brace lines 128 are connected to the bars 58, 60, 70 and 72 via conventional fasteners such as sheet metal screws.

The ground brace lines 130 are generally utilized to further anchor the support posts 28 and 32 to the earth. More particularly, one end of one ground brace lines 130 is connected to one of the support posts 28 and 32, and the opposite end of the respective ground brace line 130 is connected to a ground stake 132, for example (shown in FIG. 1).

In one embodiment, the brace lines 126, 128 and 130 are in the form of conventional wire cable or the like.

A first wind deflector 150 is positioned generally on the earth's surface 12 on one side of the shaft 34 and disposed near the first side 22 of the cavity 14. The first wind deflector 150 includes a wind deflecting surface 152 having a first side and a second side (the sides of the first wind deflector 150 wind deflecting surface 152 are not shown in the drawings) and a first end 154 and a second end 156. The wind deflecting surface 152 of the first wind deflector 150 extends along the first side 22 of the cavity 14 in a direction generally parallel with respect to the shaft 34 at least a distance approximately the same as the length of the blades 54 generally between the first and the second sides 84 and 86 of the blades 54.

The first end 154 of the first wind deflector 150 is disposed near the earth's surface 12 and spaced a distance 158 from the first side 22 of the cavity 14, the first end 154 being spaced a distance 160 from the shaft 34. The wind deflecting surface 152 extends at an angle 162 in a generally upwardly direction and in a direction generally toward the first side 22 of the cavity 14 and generally toward the shaft 34 terminating with the second end 156 of the wind deflecting surface 152. It has been found desirable to construct the first wind deflector 150 such that the angle 162 is less than about forty-five degrees.

The second end 156 of the wind deflecting surface 152 is spaced a distance 164 from the shaft 34 which is sufficient such that the second end 156 is spaced a distance from the blades 54 to permit rotation of the blades 54 in the first and the second directions of rotation 40 and 42 during the operation of the wind collecting apparatus 10. In one preferred embodiment, the second end 156 is disposed in a horizontal plane substantially coplanar with the horizontal planar disposition of the shaft 34 and substantially coplanar with the first and the second ends 80 and 82 of each of the blades 54 in one position of each of the blades 54.

During the operation of the wind collecting apparatus 10, the wind deflecting surface 152 is shaped and positioned with respect to the blades 54 to direct a portion of the wind blowing in the general direction 92 upwardly in a direction generally away from the cavity 14 and against the blades 54 for causing the blades 54 to be rotated in the first direction of rotation 40, the shaft 34 being thereby rotated in the first direction of rotation 40. The wind deflecting surface 152 is further shaped and positioned to substantially block a portion of wind blowing in the general direction 92 from impacting against some of the blades 54 in a direction tending to cause the blades 54 and the shaft 34 connected thereto to be rotated in the second direction of rotation 40. In other words, the first wind deflector 150 is shaped and positioned to utilize a maximum amount of the wind energy from the wind blowing in the general direction 92 for causing the blades 54 to be rotated in the first direction of rotation 40 and to minimize the amount of wind energy from the wind blowing in the general direction 92 from impacting against the blades 54 in a manner and direction tending to cause the rotation of the blades 54 and the shaft 34 connected thereto in the second direction of rotation 42.

A second wind deflector 170 is positioned generally on the earth's surface 12 on one side of the shaft 34 and disposed near the second side 24 of the cavity 14. The second wind deflector 170 includes a wind deflecting surface 172 having a first side and a second side (the sides of the second wind deflector 170 wind deflecting surface 172 are not shown in the drawings) and a first end 174 and a second end 176. The wind deflecting surface 172 of the second wind deflector 170 extends along the second side 24 of the cavity 14 in a direction generally parallel with respect to the shaft 34 at least a distance approximately the same as the length of the blades 54 generally between the first and the second sides 84 and 86 of the blades 54.

The first end 174 of the second wind deflector 170 is disposed near the earth's surface 12 and spaced a distance 178 from the second side 24 of the cavity 14, the first end 174 being spaced a distance 180 from the shaft 34. The wind deflecting surface 172 extends at an angle 182 in a generally upwardly direction and in a direction generally toward the second side 24 of the cavity 14 and generally toward the shaft 34 terminating with the second end 176 of the wind deflecting surface 172. It has been found desirable to construct the second wind deflector 170 such that the angle 172 is less than about forty-five degrees.

The second end 176 of the wind deflecting surface 172 is spaced a distance 184 from the shaft 34 which is sufficient such that the second end 176 is spaced a distance from the blades 54 to permit rotation of the blades 54 in the first and the second directions of rotation 40 and 42 during the operation of the wind collecting apparatus 10. In one preferred embodiment, the second end 176 is disposed in a horizontal plane substantially coplanar with the horizontal disposition of the shaft 34 and substantially coplanar with the first and the second ends 80 and 82 of each of the blades 54 in one position of each of the blades 54, the second end 176 also being disposed in a horizontal plane substantially coplanar with the horizontal planar disposition of the second end 156 of the first wind deflector 150 in this position.

During the operation of the wind collecting apparatus 10, the wind deflecting surface 172 is shaped and positioned with respect to the blades 54 to direct a portion of the wind blowing in the general direction 94 upwardly in a direction generally away from the cavity 14 and against the blades 54 for causing the blades 54 to be rotated in the second direction of rotation 42, the shaft 34 being thereby rotated in the second direction of rotation 42. The wind deflecting surface 172 is further shaped and positioned to substantially block a portion of wind blowing in the general direction 94 from impacting against some of the blades 54 in a direction tending to cause the blades 54 and the shaft 34 connected thereto to be rotated in the first direction of rotation 40. In other words, the second wind deflector 170 is shaped and positioned to utilize a maximum amount of the wind energy from the wind blowing in the general direction 94 for causing the blades 54 to be rotated in the second direction of rotation 42 and to minimize the amount of wind energy from the wind blowing in the general direction 94 impacting against the blade 54 in a manner and direction tending to cause the rotation of the blades 54 and the shaft 34 connected thereto in the first direction of rotation 40.

The wind collecting apparatus 10 also includes a first end deflector 190 (shown in FIG. 2) having a wind deflecting surface 192 with a first end 194 and a second end 196. The first end 194 is spaced a distance 198 from the first end 18 of the cavity 14 and the wind deflecting surface 192 extends a distance upwardly in a direction generally toward the cavity 14 at an angle 200 terminating with the second end 196. The second end 196 is disposed in a horizontal plane substantially coplanar with respect to the horizontal planar disposition of the shaft 34 and of the second ends 156 and 176 of the first and the second wind deflectors 150 and 170.

The wind collecting apparatus 10 also includes a second end deflector 202 (shown in FIG. 2) having a wind deflecting surface 204 with a first end 206 and a second end 208. The first end 206 is spaced a distance 210 from the second end 20 of the cavity 14 and the wind deflecting surface 204 extends a distance upwardly in a direction generally toward the cavity 14 at an angle 212 terminating with the second end 208. The second end 208 is disposed in a horizontal plane substantially coplanar with respect to the horizontal planar disposition of the shaft 34 and of the second ends 156 and 176 of the first and second wind deflectors 150 and 170.

In one version of the present invention, the first and second wind deflectors 150 and 170 are each formed from some of the soil excavated from the earth during the formation of the cavity 14. Thus, the deflectors 150 and 170 can be formed in a relatively fast and efficient manner and at substantially no cost. In a similar manner and for the same reasons, the first and the second end deflectors 190 and 202 may be constructed utilizing some of the earth excavated during the forming of the cavity 14.

The first and the second wind deflectors 150 and 170 are oriented and constructed with respect to the blades 54 and the cavity 14 to substantially prevent wind from acting on some of the blades 54 in a manner tending to cause a counter-rotational force. Thus, the wind deflectors 150 and 170 cooperate to maximize the utilization of wind energy and to increase the efficiency of the wind collecting apparatus 10.

The first wind deflector 150 is positioned with respect to the blades 54 such that the distance or clearance between the second end 156 of the first wind deflector 150 and the outermost second side 86 of the blades 54 is maintained at a minimum while still allowing sufficient clearance between the blades 54 and the first wind deflector 150 to permit the rotation of the rotating assembly 44. Further, the second wind deflector 170 is positioned with respect to the blades 54 such that the distance or clearance between the second end 176 of the second wind deflector 170 and the outermost second side 86 of the blades 54 during the rotation of the rotating assembly 44 is maintained at a minimum while still allowing sufficient clearance between the blades 54 and the second wind deflector 170 to permit the rotation of the rotating assembly 44. It has been found that this particular positioning of the wind deflectors 150 and 170 with respect to the blades 54 operates to increase the efficiency of the wind collecting apparatus 10.

In an assembled operating position of the wind collecting apparatus 10, the axis of rotation 39 defined via the shaft 34 is positioned to extend in a generally transverse direction with respect to the direction of the prevailing wind in a particular location.

As the prevailing wind blows in the general direction 92, some of the wind will impact against the first surface 88 of at least one of the blades 54, some of the wind moving over the wind deflecting surface 152 of the first wind deflector 150 and being directed against the first surface 88 of at least one of the blades 54. The wind moving in the general direction 92 including the wind directed via the wind deflecting surface 152 of the first wind deflector 150 impacts against the first surface 88 of some of the blades 54 resulting in a force being applied to blades 54 in a direction tending to cause the blades 54 to be moved in a general direction for causing the rotating assembly 44 to be rotated in the first direction of rotation 40, a portion of the blades 54 passing through the space 26 formed via the cavity 14 during the rotation of the rotating assembly 44 in the first direction of rotation 40. Utilizing four (4) blades 54 oriented about the shaft 34 in a manner shown in FIG. 1 assures that at least one of the blades 54 will be positioned or disposed generally above the horizontal planar disposition of the second end 156 of the first wind deflector 150, thereby assuring at least one blade 54 will always be in a position permitting wind blowing in the general direction 92 to impact against the first surface 88 of such blade 54. The rotating assembly 44 will be rotated in the first direction of rotation 40 when the velocity of the wind blowing in the general direction 92 is sufficient to result in a sufficient force applied to blades 54. The wind velocity (wind energy) necessary to cause the rotation of the rotating assembly 44 is determined via the relative size of the wind collecting apparatus 10 including the relative weight of the materials utilized in constructing the wind collecting apparatus 10.

As the rotating assembly 44 rotates in the first direction of rotation 40, as a result of wind blowing in the general direction 92, there will always be at least one blade 54 oriented or disposed generally below the horizontal planar disposition of the second ends 156 and 176 of the first and the second wind deflectors 150 and 170 assuming a wind collecting apparatus 10 constructed to have the blades 54 orientation as shown in FIG. 1. In this position of the blades 54, wind blowing in the general direction 92 normally would impact against the second surface 90 and result in a force applied at the blade 54 in a direction tending to cause the rotation of the rotating assembly 44 in a counter-rotational direction or, in other words, in the second direction of rotation 42. The walls formed in the earth via the cavity 14 cooperate with the first wind deflector 150 to substantially block or reduce the amount of wind blowing in the general direction 92 from impacting against the second surface 90, thereby maximizing the utilization of the energy of the wind blowing in the general direction 92 for causing the rotation of the rotating assembly 4 in the first direction of rotation 40. Further, the walls formed in the earth via the cavity 14 cooperate with the first wind deflector 150 in a manner such that air which is present in the space defined via the walls in the earth formed via the cavity 14 and the first wind deflector 150 particularly the air near the lowermost cavity surface 16 tends to flow upwardly toward the earth's surface 12 as a result of a pressure differential, the air pressure near the lowermost cavity surface 16 being lower than the air pressure generally at and above the earth's surface 12. Thus, an area of lower air pressure is created generally near the lowermost cavity surface 16 and it has been found that this area of lower air pressure within the cavity 14 results in an increase in the operating efficiency of the wind collecting apparatus 10 (an increase in the rotational rate of speed of the shaft 34) because of the reduced air resistance encountered by the blades 54 passing through the cavity 14.

As the prevailing wind blows in the general direction 94, some of the wind will impact against the second surface 90 of at least one of the blades 54, some of the wind moving over the wind deflecting surface 172 of the second wind deflector 170 and being directed against the second surface 90 of at least one of the blades 54. The wind moving in the general direction 94 including the wind directed via the wind deflecting surface 172 of the second wind deflector 170 impacts against the second surface 90 of some of the blades 54 resulting in a force being applied to blades 54 in a direction tending to cause the blades 54 to be moved in a general direction for causing the rotating assembly 44 to be rotated in the second direction of rotation 42, a portion of the blades 54 passing through the space 26 formed via the cavity 14 during the rotation of the rotating assembly 44 in the second direction of rotation 42. Utilizing four (4) blades 54 oriented about the shaft 34 in a manner shown in FIG. 1 assures that at least one of the blades 54 will be positioned or disposed generally above the horizontal planar disposition of the second end 176 of the second wind deflector 170, thereby assuring at least one blade 54 will always be in a position permitting wind blowing in the general direction 94 to impact against the second surface 90 of such blade 54. The rotating assembly 44 will be rotated in the second direction of rotation 42 when the velocity of the wind blowing in the general direction 94 is sufficient to result in a sufficient force applied to the blades 54. The wind velocity (wind energy) necessary to cause the rotation of the rotating assembly 44 is determined via the relative size of the wind collecting apparatus 10 including the relative weight of the materials utilized in constructing the wind collecting apparatus 10.

As the rotating assembly 44 rotates in the second direction of rotation 42 as a result of the wind blowing in the general direction 94, there will always be at least one blade 54 oriented or disposed generally below the horizontal planar disposition of the second ends 156 and 176 of the first and the second wind deflectors 150 and 170 assuming a wind collecting apparatus 10 constructed to have blades 54 oriented as shown in FIG. 1. In this position of the blades 54, wind blowing in the general direction 94 normally would impact against the first surface 88 resulting in a force applied at the blades 54 in a direction tending to cause the rotation of the rotating assembly 44 in a counter-rotational direction or, in other words, in the first direction of rotation 40. The walls formed in the earth via the cavity 14 cooperate with the second wind deflector 170 to substantially reduce the amount of wind blowing in the general direction 94 from impacting against the first surface 88, thereby maximizing the utilization of the energy of the wind blowing in the general direction 94, for causing the rotation of the rotating assembly 44 in the second direction of rotation 42.

It should be noted that in the particular embodiment of the invention shown in the drawings, the blades 54 are curved or formed on a radius and the curved blades 54 are positioned on the shaft 34 to maximize the effective utilization of wind blowing in the general direction 92 for causing rotation of the rotating assembly 44 in the first direction of rotation 40. This particular construction and orientation of the blades 54 results in a less efficient utilization of the wind energy resulting from wind blowing in the general direction 94 for causing the rotation of the rotating assembly 44 in the second direction of rotation 42 as compared with the utilization of wind energy resulting from wind blowing in the general direction 92 for causing the rotation of the rotating assembly 44 in the first direction of rotation 40. In a particular area, it sometimes can be determined that the prevailing winds generally blow in one particular direction and, in this embodiment of the invention, the wind collecting apparatus 10 should be oriented and disposed to effectively utilize the wind energy resulting from wind blowing in that particular direction. As shown in FIG. 1, the wind collecting apparatus 10 is oriented in a manner assuming that the prevailing winds generally blow in the direction 92, for example.

It has been found that wind blowing over the wind deflecting surface 152 of the first wind deflector 150 in the general direction 92 results in a velocity increase of the wind blowing through the rotating assembly 44 in the area immediately above the wind collecting apparatus 10, thereby resulting in an increase in the operating efficiency of the wind collecting apparatus 10 (an increase in the rotational rate of speed of the rotating assembly 44). By the same token, wind blowing over the wind deflecting surface 172 of the second wind deflector 170 in the general direction 94 also results in a velocity increase of the wind blowing through the rotating assembly 44 in the area immediately above the wind collecting apparatus 10, thereby resulting in an increase in the operating efficiency of the wind collecting apparatus 10 (an increase in the rotational rate of speed of the rotating assembly 44).

The rotational motion of the shaft 34 resulting from the operation of the wind collecting apparatus 10 can be utilized in various applications. For example, the first and the second wheels 62 and 74 or one of the first and the second wheels 62 and 74 can be connected or coupled to an apparatus such as an electric generator (not shown) or the like. For example, an electric generator could be positioned near the wind collecting apparatus 10 and a pulley belt or the like could be connected to the electric generator and the first wheel 62 via the groove 64 portion of the first wheel 62. As another example the first and the second wheels 62 and 74 could be directly connectable to a generator apparatus or the like via direct-drive wheels (not shown) which are connected to the generator apparatus.

As mentioned before, the first and the second wind deflectors can be constructed of some material other than excavated earth. In one embodiment, the rotating assembly 44 can be mounted or supported on the earth's surface 12 or on the upper surface of the retainer (mentioned before). In this embodiment, the shaft 34 would be supported a distance equal to the distance 36 above the earth's surface or above the upper surface of the retainer, as the case may be. The first wind deflector would be oriented on one side of the shaft 34 and the second wind deflector would be oriented on the opposite side of the shaft 34 in a manner similar to the orientation of the wind deflectors 150 and 170 and the shaft 34 described before. In this embodiment, the wind deflectors are constructed similar to the wind deflectors 150 and 170 described before, except the wind deflecting surface of the first wind deflector extends a distance angularly upwardly generally toward the shaft 34 terminating with the second end thereof and the second end is disposed in a horizontal plane substantially coplanar with the respect to the horizontal planar disposition of the shaft 34, the second end of the wind deflecting surface of the first wind deflector being disposed a distance above the earth's surface or the upper surface of the retainer substantially equal to the distance 36 (shown in FIGS. 1 and 2). The wind deflecting surface of the second wind deflector extends a distance angularly upwardly generally toward the shaft 34 terminating with the second end thereof and the second end of the second wind deflector is disposed in a horizontal plane substantially coplanar with respect to the horizontal planar disposition of the shaft 34 and the horizontal planar disposition of the second end of the wind deflecting surface of the first wind deflector, the second end of the wind deflecting surface of the second wind deflector being disposed a distance above the earth's surface or the upper surface of the retainer substantially equal to the distance 36 (shown in FIGS. 1 and 2). In this embodiment of the invention, end deflectors can be utilized and such end deflectors would be constructed and oriented similar to the first and the second end deflectors 190 and 202, except the end deflectors may be constructed of some material other than excavated earth and the second end of the first end deflector would be disposed a distance substantially equal to the distance 36 (shown in FIGS. 1 and 2) above the earth's surface or the upper surface of the retainer, the second end of the second end deflector being disposed a distance substantially equal to the distance 36 (shown in FIGS. 1 and 2) above the earth's surface or the upper surface of the retainer. In summary, the above described embodiment of the invention is similar to the embodiment shown in FIGS. 1 and 2 except the cavity is not formed in the earth's surface or in the retainer and the first and second wind deflectors and the first and second end deflectors are each constructed to compensate for the fact that the rotating assembly 44 is mounted on the earth's surface or the upper surface of the retainer in lieu of supporting the rotating assembly 44 at least partially within the cavity formed in the earth's surface or the upper surface of the retainer in a manner as shown in FIGS. 1 and 2.

Changes may be made in the construction and operation of the various parts, elements and assemblies and in the steps of the methods described herein without departing from the spirit and scope of the invention as described in the following claims.

What is claimed is:

1. A wind collecting apparatus, comprising:
   a shaft;
   means for journally supporting the shaft for rotation about an axis of rotation; and
   at least one blade, each blade having a first side, a second side, a first end, a second end, a first surface extending generally between the first and second ends and generally between the first and second sides, and a second surface extending generally between the first and second ends and generally between the first and second sides, the first end of the blade being connected to the shaft and the blade extending axially along a portion of the length of the shaft generally between the opposite ends of the shaft, the second surfaces of the blade each extend a distance radially from the shaft and a distance axially along the length of the shaft generally between the opposite ends of the shaft, wind moving generally in one direction impacting against the first surface of the blade tending to move the blade in one direction for rotating the shaft in the first direction and wind moving generally in an opposite direction impacting against the second surface of the blade tending to move the blade in an opposite direction for rotating the shaft in the second direction, each blade comprising:
   a base constructed of a flexible material having a first side forming the first side of the blade, a second side forming the second side of the blade, a first end forming the first end of the blade, a second end forming the second end of the blade, a first surface forming the first surface of the blade and a second surface forming the second surface of the blade;
   a first mesh screen having a plurality of spaced apart wires extending in one direction and a plurality of spaced apart wires extending in a generally transverse direction, the wires extending in one direction being connected to adjacent portions of the wires extending in the transverse direction to form a meshlike screen, the first mesh screen being disposed on the first surface of the base and extending over a substantial portion of the first surface of the base, the first mesh screen enhancing the structural integrity of the blade; and
   a second mesh screen having a plurality of spaced apart wires extending in a generally transverse direction, the wires extending in the one direction being connected to adjacent portions of the wires extending in the transverse direction to form a mesh like screen, the second mesh being disposed on the second surface of the base and extending over a substantial portion of the second surface of the base, the second mesh screen cooperating with the first mesh screen for enhancing the structural integrity of the blade.

2. The apparatus of claim 1 defined further to include:
   a first wind deflector positioned on one side of the shaft and spaced a distance from the blades to permit rotation of the shaft and the blades during the operation of the wind collecting apparatus, the first wind deflector being shaped and positioned with respect to the blades for directing a portion of the wind against some of the blades in a general direction for causing rotation of the blades and the shaft connected thereto in the first direction of rotation and the first wind deflector being shaped and positioned with respect to blades for blocking a portion of the wind from impacting against some of the blades in a direction tending to cause rotation of the blades and the shaft connected thereto in a second direction of rotation, the first wind deflector including a wind deflecting surface having a first side, a second side, a first end and a second end, the first end of the wind deflecting surface being spaced a distance from the shaft and the wind deflecting surface extending at an angle in a generally upwardly direction generally toward the shaft terminating with the second end, the second end of the wind deflecting surface being spaced a distance from the blades during the rotation of the shaft and the blades connected thereto.

3. The apparatus of claim 2 wherein a cavity is formed in the earth's surface having opposite first and second ends, a first side and a second side and extending a distance into the earth terminating with a lowermost cavity surface; and wherein the shaft is defined further as being supported a distance above the lowermost cavity surface and extending a distance generally between the opposite ends of the cavity and generally parallel with the earth's surface, a portion of the blades passing through the cavity during the rotation of the blades; and wherein the first wind deflector being disposed near the first side of the cavity and the wind deflecting surface of the first wind deflector extending a distance generally along the first side ,of the cavity, the first end of the wind deflecting surface of the first wind deflector being space a distance from the first side of the cavity and the wind deflecting surface of the first wind deflector extending at an angle in a generally upwardly direction generally toward the cavity.

4. The apparatus of claim 3 defined further to include:
   a second wind deflector positioned near the second side of the cavity, the second wind deflector having a wind deflecting surface with a first end, a second end, a first side and a second side, the first end of the wind deflecting surface being spaced a distance from the second side of the cavity and the wind deflecting surface extending at an angle in a generally upwardly direction generally toward the shaft terminating with the second end, the second end of the wind deflecting surface being spaced a distance from the blades during the rotation of the blades and the shaft connected thereto, the second wind deflector being shaped and positioned with respect to the blades for directing a portion of the wind against some of the blades in a general direction for causing rotation of the blades and the shaft connected thereto in the second direction of rotation and the second wind deflector being shaped and positioned with respect to blades for blocking a portion of the wind from impacting against the blades in a direction tending to cause rotation of the blades and the shaft connected thereto in the first direction of rotation, the wind deflecting surface of the second wind deflector extending a sufficient distance in a direction generally the second side of the cavity so the wind deflecting surface of the second wind deflector extends along a substantial portion of the length of the blades generally between the first and the second sides of the blades.

5. The apparatus of claim 4 wherein the first wind deflector is defined further as having the second end of the wind deflecting surface disposed in a horizontal plane substantially coplanar with the horizontal planar disposition of the shaft; and wherein the second wind deflector is defined further as having the second end of the wind deflecting surface disposed in a horizontal plane substantially coplanar with the horizontal planar disposition of the shaft.

6. The apparatus of claim 4 defined further to include:
a first end deflector, having a wind deflecting surface with a first end and a second end, the first end being spaced a distance from the first end of the cavity and the wind deflecting surface extending in a generally upwardly direction toward the cavity terminating with the second end; and
a second end deflector, having a wind deflecting surface with a first end and a second end, the first end being spaced a distance from the first end of the cavity and the wind deflecting surface extending in a generally upwardly direction toward the cavity terminating with the second end.

7. The apparatus of claim 4 wherein the wind deflecting surfaces of the first and the second wind deflectors are each defined further as extending in a direction generally parallel with respect to the shaft at least a distance approximately the same as the length of the blade generally between the first and the second sides of the blade.

8. The apparatus of claim 1 wherein each blade is defined further as being formed on a radius generally between the first and the second ends, the first end of each blade being connected to the shaft and each blade extending on a generally curvilinear path a distance generally radially from the shaft terminating with the second end thereof.

9. The apparatus of claim 8 wherein each blade is defined further as having the first end disposed in a plane extending generally radially from the shaft and the second end being disposed in a plane substantially coplanar with respect to the planar disposition of the first end.

10. A blade construction for use with a wind collecting apparatus comprising:
a base constructed of a flexible material having a first side, a second side, a first end, a second end, a first surface extending generally between the first and the second ends and generally between the first and the second sides, and a second surface extending generally between the first and the second ends and generally between the first and the second sides;
a first mesh screen having a plurality of spaced apart wires extending in one direction and a plurality of wires extending in a generally transverse direction, the wires extending in one direction being connected to adjacent portions of the wires extending in the transverse direction to form a meshlike screen, the first mesh screen being disposed on the first surface of the base and extending over a substantial portion of the first surface of the base, the first mesh screen enhancing the structural integrity of the blade; and
a second mesh screen having a plurality of spaced apart wires extending in a generally transverse direction, the wires extending in the one direction being connected to adjacent portions of the wires extending in the transverse direction to form a mesh like screen, the second mesh being disposed on the second surface of the base and extending over a substantial portion of the second surface of the base, the second mesh screen cooperating with the first mesh screen for enhancing the structural integrity of the blade.

11. The apparatus of claim 10 wherein the blade is defined further as being formed on a radius generally between the first and the second ends.

12. The apparatus of claim 11 wherein the blade is defined further as having the first end disposed in a plane substantially coplanar with the planar disposition of the second end of the blade.

* * * * *